(12) United States Patent
Nomoto (10) Patent No.: US 11,932,180 B2
(45) Date of Patent: Mar. 19, 2024

(54) ELECTRIC WIRE PROTECTION COVER STRUCTURE AND ELECTRIC WIRE ROUTING UNIT

(71) Applicant: Yazaki Corporation, Tokyo (JP)

(72) Inventor: Takashi Nomoto, Aichi (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/694,901

(22) Filed: Mar. 15, 2022

(65) Prior Publication Data

US 2022/0306016 A1 Sep. 29, 2022

(30) Foreign Application Priority Data

Mar. 26, 2021 (JP) ................. 2021-052677

(51) Int. Cl.
*B60R 16/02* (2006.01)
*H02G 3/04* (2006.01)
*H02G 3/30* (2006.01)

(52) U.S. Cl.
CPC ........... *B60R 16/0215* (2013.01); *H02G 3/04* (2013.01); *H02G 3/0418* (2013.01); *H02G 3/30* (2013.01)

(58) Field of Classification Search
CPC ............ B60R 16/0207; B60R 16/0215; H02G 3/0418; H02G 3/0437; H02G 3/0608
See application file for complete search history.

(56) References Cited

U.S. PATENT DOCUMENTS

| | | | |
|---|---|---|---|
| 8,012,248 B2 * | 9/2011 | Yun | F01N 3/037 96/244 |
| 2003/0049583 A1 * | 3/2003 | Pitnick | A61C 7/00 433/18 |
| 2012/0295485 A1 | 11/2012 | Ikeda et al. | |
| 2019/0036313 A1 * | 1/2019 | Okamoto | B60R 16/0215 |
| 2019/0123530 A1 * | 4/2019 | Tokuyama | H02G 3/0468 |

FOREIGN PATENT DOCUMENTS

| | | | | |
|---|---|---|---|---|
| EP | 1587194 A2 * | 10/2005 | | H02G 3/0418 |
| JP | 7-131913 A | 5/1995 | | |
| JP | 8-96863 A | 4/1996 | | |
| JP | 5734607 B2 | 6/2015 | | |
| KR | 20060029025 A * | 4/2006 | | B60R 6/0215 |

\* cited by examiner

*Primary Examiner* — Paresh Paghadal
(74) *Attorney, Agent, or Firm* — Sughrue Mion, PLLC (57) ABSTRACT

An electric wire protection cover structure includes an electric wire housing part in which an electric wire is inserted through an opening and housed, an electric wire protection cover that closes the opening, a hinge part that moves the electric wire protection cover relative to the opening between an open position and a closed position, a regular locking mechanism that locks the electric wire protection cover to the electric wire housing part at the closed position where the opening is closed, and a temporary locking mechanism that locks the electric wire protection cover to the electric wire housing part at the open position where the opening is not closed.

8 Claims, 6 Drawing Sheets

ELECTRIC WIRE PROTECTION COVER STRUCTURE AND ELECTRIC WIRE ROUTING UNIT

CROSS-REFERENCE TO RELATED APPLICATION(S)

The present application claims priority to and incorporates by reference the entire contents of Japanese Patent Application No. 2021-052677 filed in Japan on Mar. 26, 2021.

BACKGROUND OF THE INVENTION

1. Field of the Invention

The present invention relates to an electric wire protection cover structure and an electric wire routing unit.

2. Description of the Related Art

Conventionally, a vehicle such as an automobile includes an electric wire routing unit for routing an electric wire along a desired route. This electric wire routing unit includes a main body including an electric wire housing part in which an electric wire is inserted through an opening and housed, an electric wire protection cover that closes the opening, and a hinge part that moves this electric wire protection cover relative to the opening between an open position and a closed position. Moreover, this electric wire routing unit includes a locking mechanism that locks the electric wire protection cover to the electric wire housing part at the closed position. This type of electric wire routing unit is disclosed in, for example, Japanese Patent No. 5734607.

Incidentally, in view of the workability when housing the electric wire in the electric wire housing part in the electric wire routing unit, for example, the electric wire protection cover is left open until the electric wire is housed inside the electric wire housing part. Therefore, before the closed position, the electric wire protection cover has a cantilever shape with a hinge side as a fixed end, and the position with respect to the opening of the electric wire housing part is unfixed. Therefore, for example, if the electric wire protection cover is brought in contact with another component or the like in the periphery while the electric wire routing unit is conveyed to the place where the electric wire is housed or before the electric wire protection cover is closed at that place, the electric wire protection cover may be overloaded and the durability thereof may deteriorate. Moreover, in this electric wire routing unit, for example, if the electric wire protection cover is brought in contact with another component or the like in the periphery in this period and moved to the closed position, the electric wire protection cover may be locked to the electric wire housing part with the locking mechanism.

SUMMARY OF THE INVENTION

The present invention is made in view of such a situation, and provides an electric wire protection cover structure that can regulate a position of an electric wire protection cover, and an electric wire routing unit that can regulate the position of the electric wire protection cover.

In order to achieve the above mentioned object, an electric wire protection cover structure according to one aspect of the present invention includes an electric wire housing part in which an electric wire is inserted through an opening and housed; an electric wire protection cover that closes the opening; a hinge part that moves the electric wire protection cover relative to the opening between an open position and a closed position; a regular locking mechanism that locks the electric wire protection cover to the electric wire housing part at the closed position where the opening is closed; and a temporary locking mechanism that locks the electric wire protection cover to the electric wire housing part at the open position where the opening is not closed.

In order to achieve the above mentioned object, an electric wire routing unit according to another aspect of the present invention includes a main body including an electric wire housing part in which an electric wire is inserted through an opening and housed; an electric wire protection cover that closes the opening; a hinge part that moves the electric wire protection cover relative to the opening between an open position and a closed position; a regular locking mechanism that locks the electric wire protection cover to the electric wire housing part at the closed position where the opening is closed; and a temporary locking mechanism that locks the electric wire protection cover to the electric wire housing part at the open position where the opening is not closed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

One embodiment of an electric wire protection cover structure and an electric wire routing unit according to the present invention is hereinafter described in detail with reference to the drawings. Note that the present invention is not limited by this embodiment.

Embodiment

One embodiment of an electric wire protection cover structure and an electric wire routing unit according to the present invention is described with reference to FIG. 1 to FIG. 6.

In FIG. 1 to FIG. 6, reference symbol 1 denotes an electric wire routing unit according to the present embodiment. By this electric wire routing unit 1, at least one electric wire We can be routed along a desired route and this electric wire routing unit is formed of an insulating material such as synthetic resin. For example, this electric wire routing unit 1 is a protector for protecting a protection target part of the electric wire We, a bus bar module housing the electric wire We with a bus bar connecting electrode terminals of the adjacent battery cells, or an electric connection box housing the electric wire We with an electric component such as a relay or a fuse. In this electric wire routing unit 1, an electric wire protection cover structure is formed by an electric wire housing part 11, an electric wire protection cover 20, a hinge part 30, a regular locking mechanism 40, and a temporary locking mechanism 50 that are described below. Here, the electric wire routing unit 1 and the electric wire We form a wire harness WH. The electric wire We described here may be formed of either one electric wire or a bundle of a plurality of electric wires. In an example below, the electric wire routing unit 1 formed as a protector is described.

The electric wire routing unit 1 includes a main body 10 including the electric wire housing part 11 in which the electric wire We is inserted through an opening 11a and housed, and an electric wire protection cover 20 that closes the opening 11a (FIG. 1 to FIG. 6).

The main body 10 described here includes two electric wire housing rooms 11A and 11B in the electric wire housing part 11, and one electric wire We is housed in each of the electric wire housing rooms 11A and 11B (FIG. 1, FIG. 2, and FIG. 4 to FIG. 6). In this electric wire housing part 11, the electric wire housing rooms 11A and 11B are formed so that two electric wires We are disposed in parallel to each other.

Figure 2:
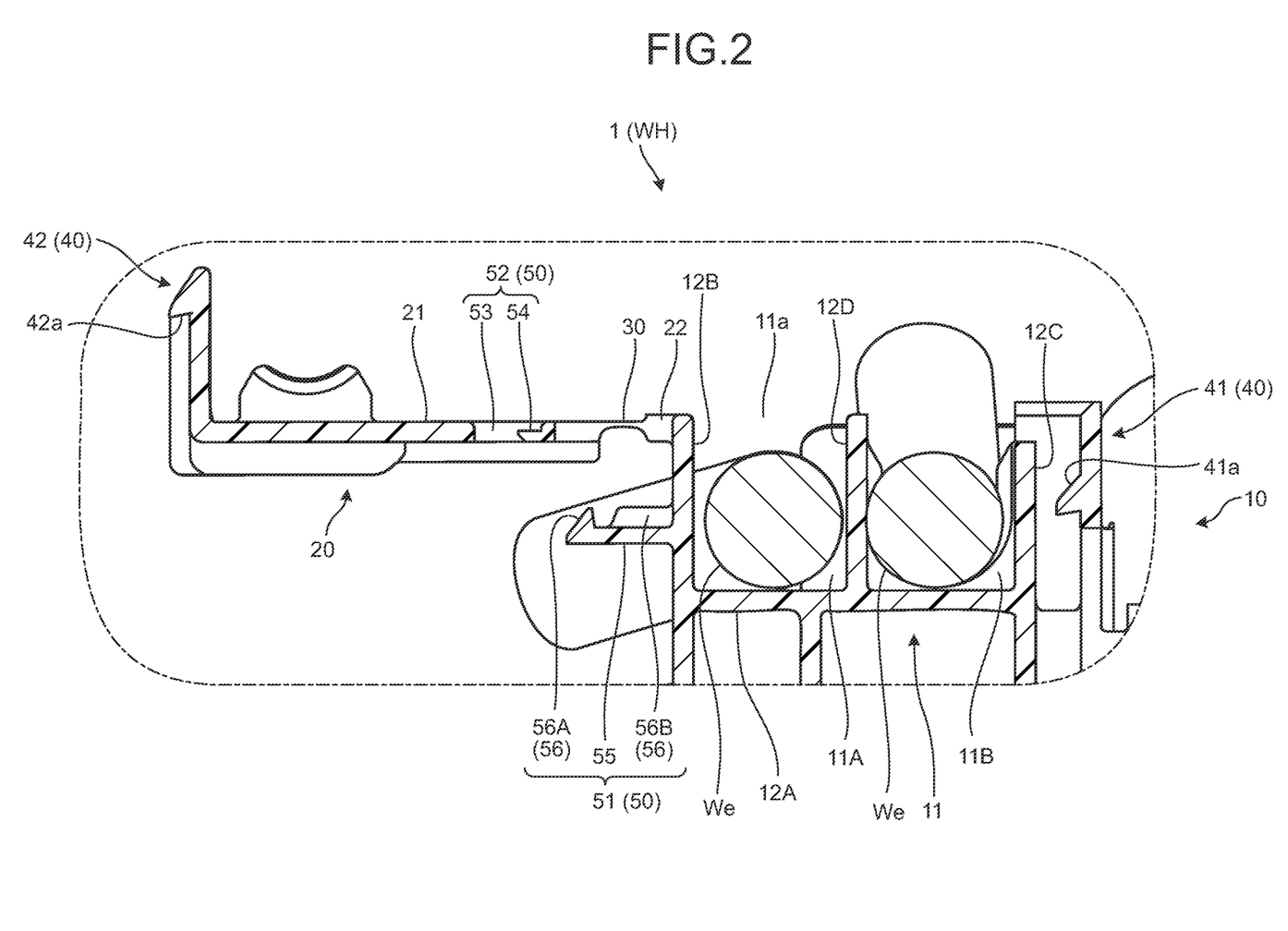
FIG. 2 is a partial magnified diagram corresponding to a cross section along X-X line in FIG. 1.
Figure 4:
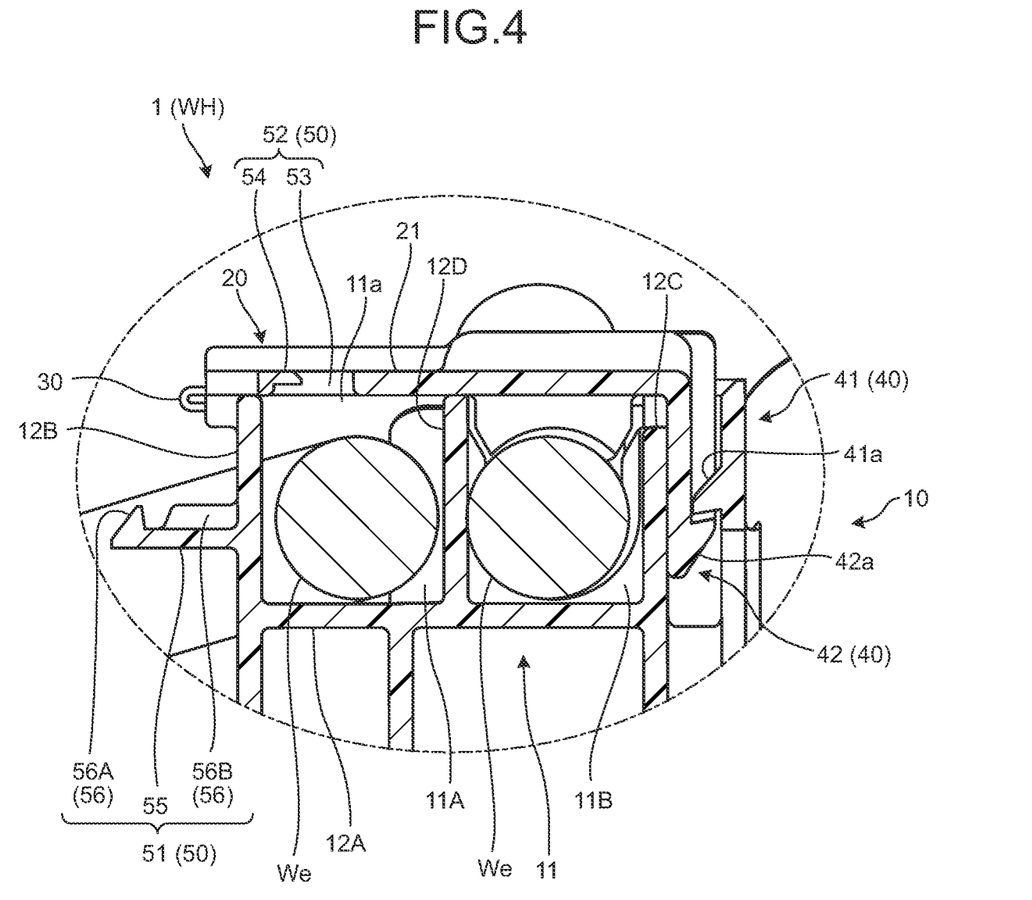
FIG. 4 is a partial magnified diagram corresponding to a cross section along X-X line in FIG. 3.
Figure 6:
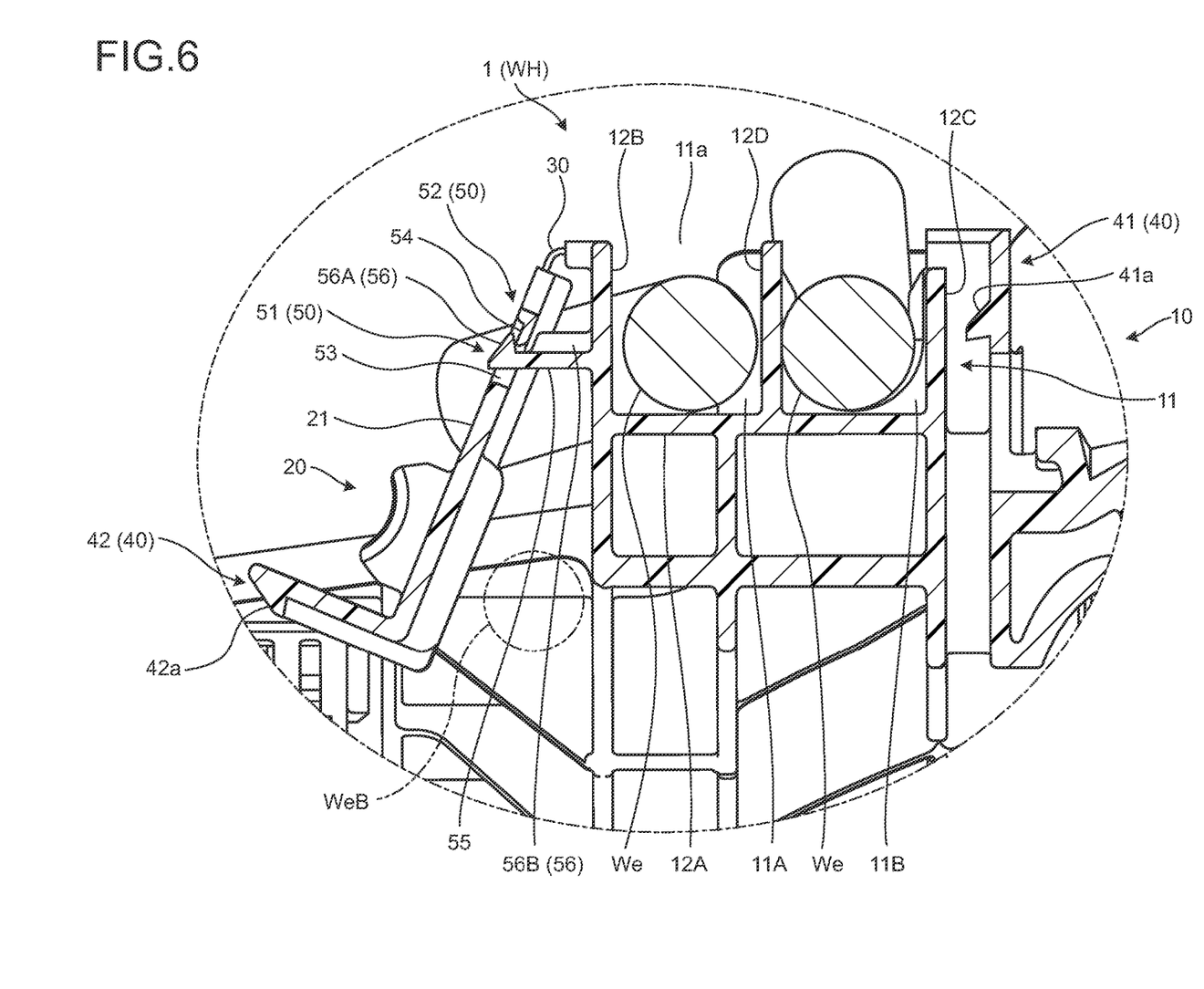
FIG. 6 is a partial magnified diagram corresponding to a cross section along X-X line in FIG. 5.

The electric wire housing part 11 includes a bottom wall 12A, a first side wall 12B and a second side wall 12C extending vertically in the same direction from the bottom wall 12A and facing each other with a space therebetween, and a partition wall 12D extending vertically from the bottom wall 12A in the same direction as the first side wall 12B and the second side wall 12C and disposed to face the first side wall 12B and the second side wall 12C with a space therebetween (FIG. 2, FIG. 4, and FIG. 6). In this electric wire housing part 11, one electric wire housing room 11A is formed between the first side wall 12B and the partition wall 12D, and the other electric wire housing room 11B is formed between the second side wall 12C and the partition wall 12D. In this electric wire housing part 11, the opening 11a is formed between end parts of the first side wall 12B and the second side wall 12C on a protruding direction side from the bottom wall 12A. In the electric wire housing part 11 described here, the first side wall 12B, the second side wall 12C, and the partition wall 12D, which are formed with a flat plate shape, are arranged in parallel to each other, and the opening 11a is formed between the parallel side parts forming the end parts of the first side wall 12B and the second side wall 12C.

Figure 3:
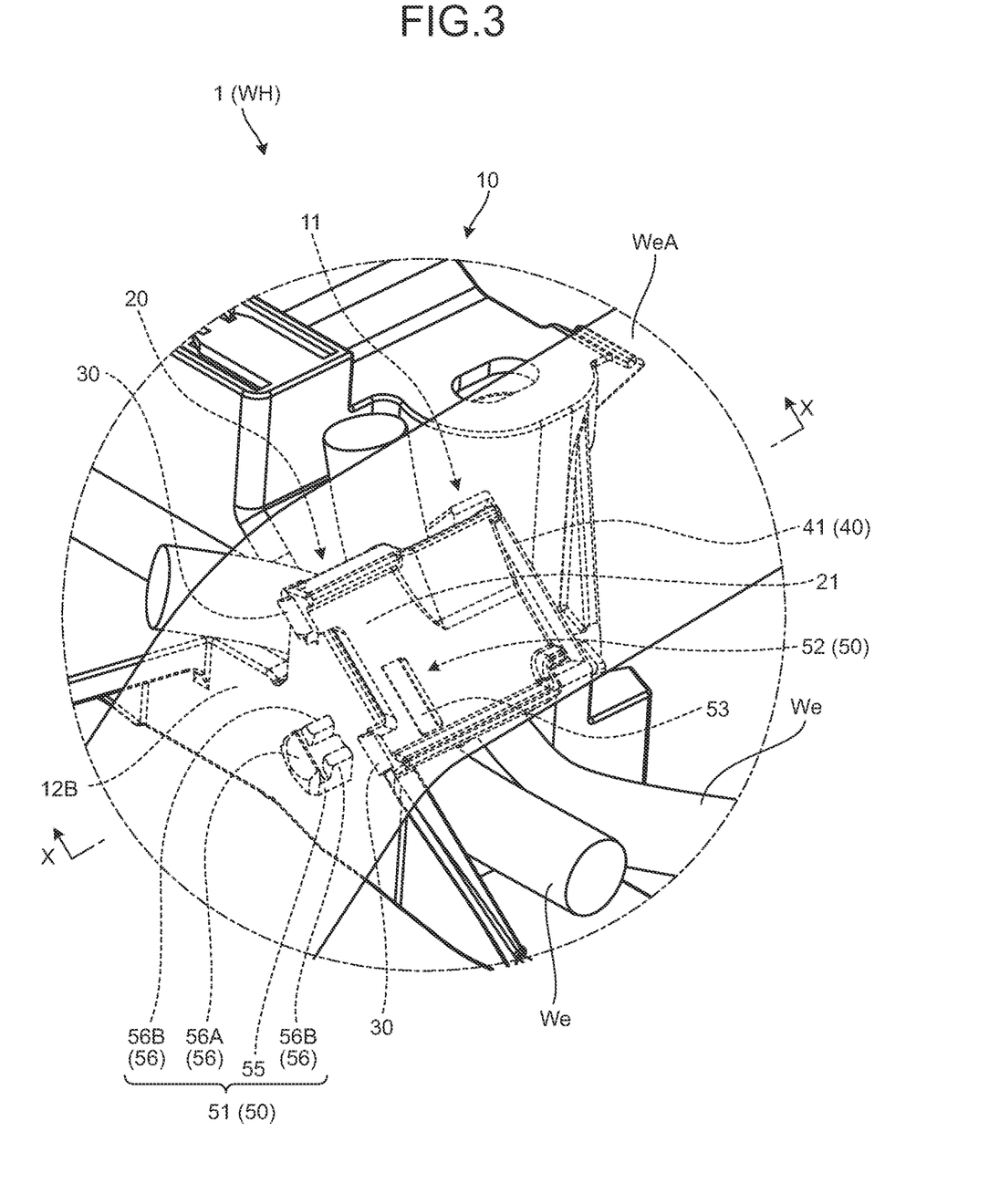
FIG. 3 is a perspective diagram illustrating the electric wire protection cover structure and the electric wire routing unit when the electric wire protection cover is at a closed position.

The electric wire protection cover 20 includes a main body 21 with a plate shape that closes the opening 11a at the closed position (FIG. 1 to FIG. 6). The main body 21 illustrated here is formed to have an approximately rectangular flat plate shape. At the closed position, the main body 21 has one side part disposed to face a side part of the first side wall 12B on the opening 11a side and another side part disposed to face a side part of the second side wall 12C on the opening 11a side (FIG. 4). For example, the electric wire protection cover 20 regulates the positions of the electric wires We housed in the electric wire housing room 11A and the electric wire housing room 11B so as to prevent these electric wires We from interfering with an electric wire WeA in another route (FIG. 3).

Figure 5:
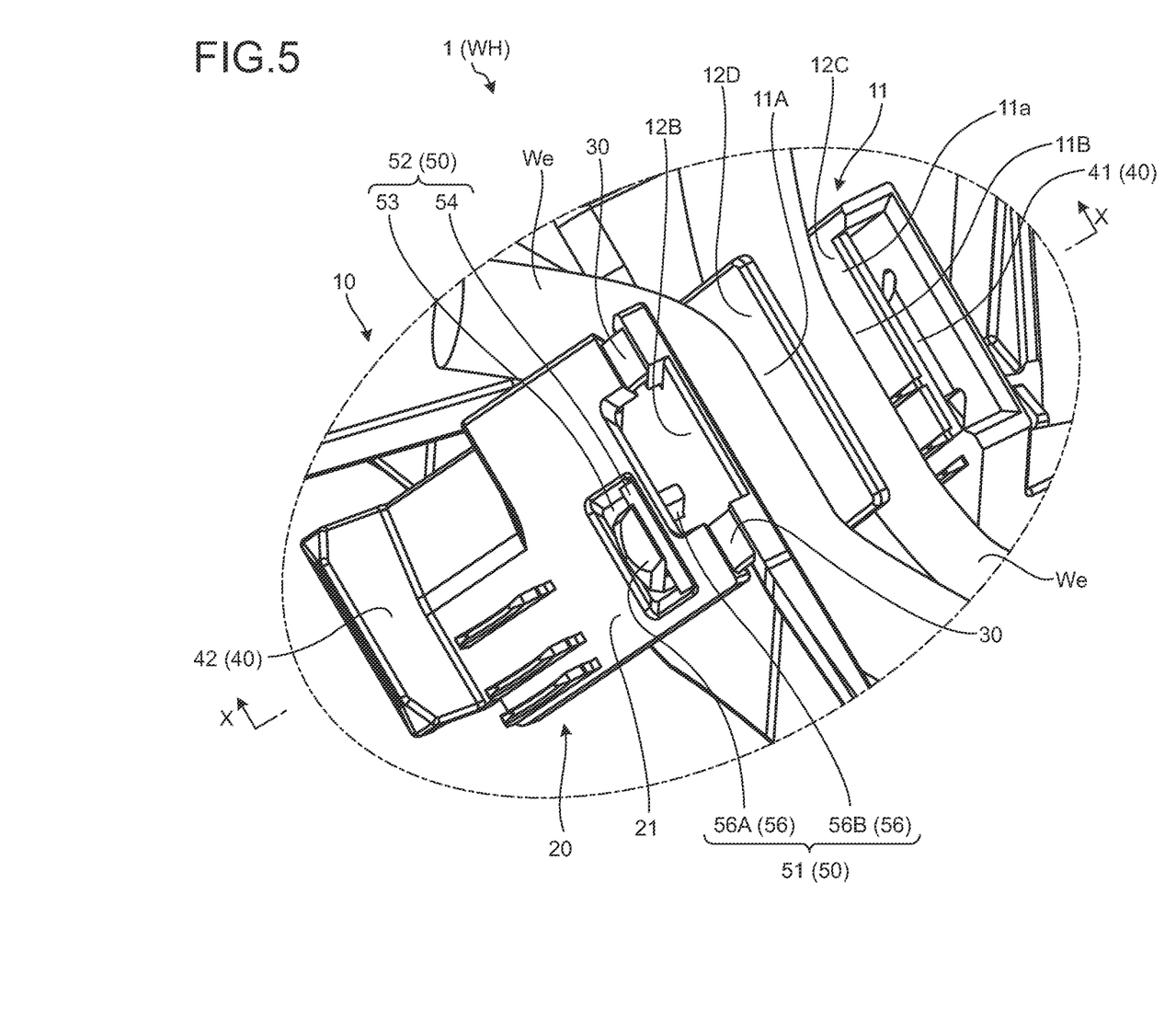
FIG. 5 is a perspective diagram illustrating the electric wire protection cover structure and the electric wire routing unit when the electric wire protection cover is at an open position.

Furthermore, the electric wire routing unit 1 includes the hinge part 30 that moves the electric wire protection cover 20 relative to the opening 11a between the open position and the closed position (FIG. 1 to FIG. 6). The open position is the position of the electric wire protection cover 20 relative to the opening 11a when the main body 21 of the electric wire protection cover 20 does not close the opening 11a (FIG. 5 and FIG. 6). On the other hand, the closed position is the position of the electric wire protection cover 20 relative to the opening 11a when the main body 21 of the electric wire protection cover 20 closes the opening 11a (FIG. 3 and FIG. 4).

Figure 1:
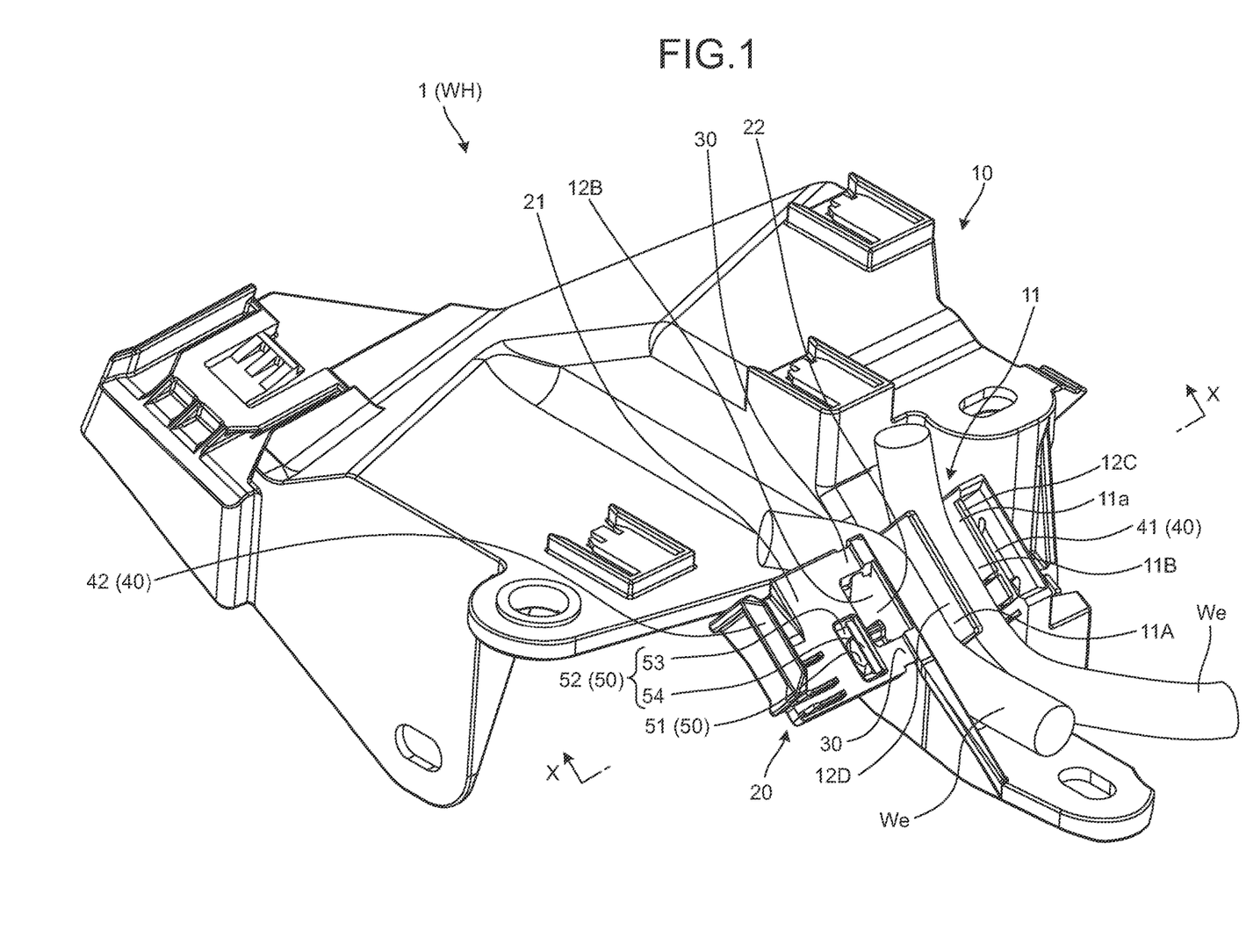
FIG. 1 is a perspective diagram illustrating an electric wire protection cover structure and an electric wire routing unit according to one embodiment.

The hinge part 30 described here is a so-called living hinge that has flexibility and small thickness, and is formed integrally with the main body 10 and the electric wire protection cover 20. Two of the hinge parts 30 are provided between the side part of the first side wall 12B on the opening 11a side and the side part of the main body (FIG. 1, FIG. 3, and FIG. 5).

Moreover, the electric wire routing unit 1 includes the regular locking mechanism 40 for locking the electric wire protection cover 20 to the electric wire housing part 11 at the closed position where the opening 11a is closed (FIG. 1 to FIG. 6). This regular locking mechanism 40 includes a first regular locking body 41 provided to the electric wire housing part 11 and a second regular locking body 42 provided to the electric wire protection cover 20 (FIG. 1, FIG. 2, and FIG. 4 to FIG. 6).

This regular locking mechanism 40 causes the first regular locking body 41 and the second regular locking body 42 to be locked together so that the electric wire protection cover 20 does not move relatively to the open position side when the electric wire protection cover 20 is at the closed position, and thus, this electric wire protection cover 20 is held by the electric wire housing part 11 while the electric wire protection cover 20 remains at the closed position. The first regular locking body 41 is provided to an outer wall surface at an end part of the second side wall 12C on the opening 11a side (side wall on the opposite side of an inner wall surface on the electric wire housing room 11B side) (FIG. 2, FIG. 4, and FIG. 6). The second regular locking body 42 described here is provided to an end part of the main body 21 that is disposed to face the end part of the second side wall 12C (FIG. 2, FIG. 4, and FIG. 6). For example, the first regular locking body 41 and the second regular locking body 42 described here include claw parts 41a and 42a, respectively, and when the electric wire protection cover 20 is at the closed position, the claw parts 41a and 42a are locked together so that the electric wire protection cover 20 does not move relatively to the open position side.

Furthermore, the electric wire routing unit 1 includes the temporary locking mechanism 50 that locks the electric wire protection cover 20 to the electric wire housing part 11 at the open position where the opening 11a is not closed (FIG. 1 to FIG. 6). This temporary locking mechanism 50 includes a first temporary locking body 51 provided to the electric wire housing part 11 and a second temporary locking body 52 provided to the electric wire protection cover 20.

This temporary locking mechanism 50 causes the first temporary locking body 51 and the second temporary locking body 52 to be locked together so that the electric wire protection cover 20 does not move relatively at least to the closed position side when the electric wire protection cover 20 is at the open position, and thus, this electric wire protection cover 20 is held by the electric wire housing part 11 while the electric wire protection cover 20 remains at the open position. One of the first temporary locking body 51 and the second temporary locking body 52 includes a penetration hole 53 and a wall part 54 continuing to the penetration hole 53 (FIG. 2, FIG. 4, and FIG. 6). The other of the first temporary locking body 51 and the second temporary locking body 52 includes a base part 55 that is inserted into the penetration hole 53 and a temporary locking part 56 that is locked to the wall part 54 (FIG. 2 to FIG. 4, and FIG. 6).

In this electric wire protection cover structure and the electric wire routing unit 1, the temporary locking mechanism 50 can keep the position of the electric wire protection cover 20 while regulating the position thereof to the open position. Therefore, even if the electric wire protection cover 20 is brought in contact with another component or the like in the periphery while the electric wire routing unit 1 is conveyed to the place where the electric wires We are housed in the electric wire housing rooms 11A and 11B or before the electric wire protection cover 20 is closed at that place, the electric wire protection cover 20 can be kept at the open position. Therefore, in this electric wire protection cover structure and the electric wire routing unit 1, it is possible to avoid the situation in which the electric wire protection cover 20 moves to the closed position unintentionally and the electric wire protection cover 20 is locked to the electric wire housing part 11 by the regular locking mechanism 40. Therefore, in the electric wire protection cover structure and the electric wire routing unit 1, when the electric wires We are housed in the electric wire housing rooms 11A and 11B, opening the electric wire protection cover 20 at the closed position by canceling the locking state of the regular locking mechanism 40 is unnecessary; therefore, the workability in housing the electric wire We can be improved.

In the electric wire protection cover structure and the electric wire routing unit 1, after the electric wires We are housed in the electric wire housing rooms 11A and 11B, the locking state of the temporary locking mechanism 50 is canceled and the electric wire protection cover 20 is moved relatively from the open position to the closed position, and this electric wire protection cover 20 is held at the closed position to the electric wire housing part 11 by the regular locking mechanism 40. Thus, in the electric wire protection cover structure and the electric wire routing unit 1, enabling the easy canceling of the locking state of the temporary locking mechanism 50 contributes to the improvement of the workability of a series of steps. In view of this, in the electric wire protection cover structure and the electric wire routing unit 1, the temporary locking mechanism 50 is easily canceled from the locking state by forming the wall part 54 as follows.

The wall part 54 locks the temporary locking part 56 when the load received from the temporary locking part 56 is less than or equal to an upper limit load, and when the load received from the temporary locking part 56 is over the upper limit load, the wall part 54 is bent to cancel the locking state of this temporary locking part 56. That is to say, when the load less than or equal to the upper limit load is applied from the temporary locking part 56, the wall part 54 keeps the temporary locking part 56 locked. On the other hand, when the load more than the upper limit load is applied from the temporary locking part 56, the wall part 54 is bent by this load and with this bending, allows the temporary locking part 56 to go over the wall part 54 so that the locking state of the temporary locking part 56 is canceled.

For example, the upper limit load is set to be larger than the input load when the electric wire routing unit 1 is conveyed and the input load when the electric wire routing unit 1 is assembled to a vehicle, and smaller than the input load applied to the electric wire protection cover 20 by an operator when the locking state of the temporary locking mechanism 50 is canceled. The input load of the operator is set to be the load that does not burden the operator when the electric wire protection cover 20 is moved from the open position to the closed position. Accordingly, the upper limit load is set to be the load that combines the input load for the safety factor considering the error due to the tolerance of the electric wire routing unit 1 with the input load when the electric wire routing unit 1 is conveyed and the input load when the electric wire routing unit 1 is assembled to a vehicle.

Thus, in the electric wire protection cover structure and the electric wire routing unit 1, the temporary locking mechanism 50 can keep the electric wire protection cover 20 locked until the operator closes the electric wire protection cover 20 and when the operator closes the electric wire protection cover 20, the operator can move the electric wire protection cover 20 relatively from the open position to the closed position after canceling the locking state of the temporary locking mechanism 50 easily.

Moreover, in the electric wire protection cover structure and the electric wire routing unit 1, for example, the temporary locking mechanism 50 is desirably configured so that the electric wire protection cover 20 is not in contact with another component or the like in the periphery while the electric wire routing unit 1 is conveyed to the place where the electric wires We are housed in the electric wire housing rooms 11A and 11B or before the electric wire protection cover 20 is closed at that place. In view of this, the place where the electric wire protection cover 20 is not in contact with the periphery before the electric wire protection cover 20 is closed is the open position and the temporary locking mechanism 50 is configured to lock the electric wire protection cover 20 to the electric wire housing part 11 at this open position. Accordingly, in the electric wire protection cover structure and the electric wire routing unit 1, the electric wire protection cover 20 is not in contact with another component or the like in the periphery while the electric wire routing unit 1 is conveyed to the place where the electric wires We are housed in the electric wire housing rooms 11A and 11B or before the electric wire protection cover 20 is closed at that place; thus, the durability of the electric wire protection cover 20, the hinge parts 30, and other components in the periphery can be improved.

Specifically, in the electric wire protection cover structure and the electric wire routing unit 1 described here, the temporary locking mechanism 50 is configured as follows. In the temporary locking mechanism 50, the electric wire housing part 11 includes the base part 55 and the temporary locking part 56 as the first temporary locking body 51 and the electric wire protection cover 20 includes the penetration hole 53 and the wall part 54 as the second temporary locking body 52 (FIG. 2, FIG. 4, and FIG. 6).

In the electric wire housing part 11, the base part 55 protrudes from an outer wall surface at an end part of the first side wall 12B on the opening 11a side (wall surface on the opposite side of an inner wall surface on the electric wire housing room 11A side), and the temporary locking part 56 with a projecting shape is provided at a free end of the base part 55 with this cantilever shape. On the other hand, in the electric wire protection cover 20, the penetration hole 53 that allows the free end of the base part 55 and the temporary locking part 56 to penetrate at the open position and the wall part 54 continuing to the penetration hole 53 are formed on the end part side of the main body 21 disposed to face the end part of the first side wall 12B. For example, the base part 55 described here is formed to have an approximately rectangular flat plate shape. The temporary locking part 56 is formed to have a claw shape at a side part of the base part 55 on the free end side. The penetration hole 53 described here is formed to have a rectangular shape. The wall part 54 described here has a rectangular flat plate shape thinner than the main body 21, and is formed to protrude from a peripheral wall of the penetration hole 53 at a place in the penetration hole 53 where the temporary locking part 56 can be locked.

In the electric wire routing unit 1, an electric wire WeB for another route may be disposed between the electric wire protection cover 20 and the first side wall 12B after the electric wire routing unit 1 is assembled to the vehicle and the electric wire protection cover 20 at the open position is closed (FIG. 6). In this case, it is desirable that the electric wire WeB is not in contact with the electric wire protection cover 20 in the electric wire routing unit 1. In view of this, the other of the first temporary locking body 51 and the second temporary locking body 52 desirably includes, as the temporary locking part 56, a first temporary locking part 56A that locks the movement of the electric wire protection cover 20 from the open position to the closed position and a second temporary locking part 56B that locks the movement of the electric wire protection cover 20 opposite to the movement from the open position to the closed position (FIG. 2 to FIG. 4, and FIG. 6).

The first temporary locking part 56A locks the movement of the electric wire protection cover 20 from the open position to the closed position, and keeps the electric wire protection cover 20 at the open position. Therefore, the first temporary locking part 56A described here is provided as a projection (claw) at the fee end of the base part 55 as described above.

On the other hand, the second temporary locking part 56B locks the movement of the electric wire protection cover 20 opposite to the movement from the open position to the closed position and keeps the electric wire protection cover 20 at the open position. This second temporary locking part 56B is formed as a projection protruding from the base part 55 and facing the first temporary locking part 56A with a space therebetween. When the electric wire protection cover 20 is at the open position, this second temporary locking part 56B causes the wall part 54 to enter the gap so as to be able to lock the electric wire protection cover 20 to this wall part 54 on the opposite side to the first temporary locking part 56A. The second temporary locking part 56B described here is provided to each of two side parts connecting the free end and the fixed end of the base part 55.

The electric wire protection cover structure and the electric wire routing unit 1 can obtain various effects described above by the use of the first temporary locking part 56A. Additionally, in the electric wire protection cover structure and the electric wire routing unit 1, even if the electric wire WeB exists between the first side wall 12B and the electric wire protection cover 20 at the open position, the second temporary locking part 56B can regulate the movement of the electric wire protection cover 20 at the open position to the electric wire WeB side. Therefore, in the electric wire protection cover structure and the electric wire routing unit 1, the first temporary locking part 56A and the second temporary locking part 56B can keep the position of the electric wire protection cover 20 while regulating the position thereof to the open position more certainly. Thus, in the electric wire protection cover structure and the electric wire routing unit 1, the electric wire protection cover 20 is not in contact with the electric wire WeB after the electric wire routing unit 1 is assembled to the vehicle and the electric wire WeB is routed between the first side wall 12B and the electric wire protection cover 20 at the open position and before the electric wire protection cover 20 is closed; therefore, the durability of the electric wire protection cover 20, the hinge parts 30, and the electric wire WeB can be improved.

Note that the electric wire protection cover 20 includes another penetration hole 22 in addition to the penetration hole 53 (FIG. 1 and FIG. 2). This penetration hole 22 is used as a hole for extracting a die used to form the first temporary locking body 51.

The electric wire protection cover structure and the electric wire routing unit according to the present embodiment can cause the temporary locking mechanism to keep the position of the electric wire protection cover while regulating the position thereof to the open position.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric wire protection cover structure comprising:
an electric wire housing part in which an electric wire is inserted through an opening and housed;
an electric wire protection cover that closes the opening;
a hinge part that moves the electric wire protection cover relative to the opening between an open position and a closed position;
a regular locking mechanism that is lockable the electric wire protection cover to the electric wire housing part at the closed position where the opening is closed; and
a temporary locking mechanism that is lockable the electric wire protection cover to the electric wire housing part at the open position where the opening is not closed, wherein
the temporary locking mechanism includes a first temporary locking body provided to the electric wire housing part and a second temporary locking body provided to the electric wire protection cover,
one of the first temporary locking body and the second temporary locking body includes a penetration hole and a wall part continuing to the penetration hole,
the other of the first temporary locking body and the second temporary locking body includes a base part that is inserted into the penetration hole and a temporary locking part that is locked to the wall part, and
the other of the first temporary locking body and the second temporary locking body includes, as the temporary locking part, a first temporary locking part that locks a movement of the electric wire protection cover from the open position to the closed position and a second temporary locking part that locks the movement of the electric wire protection cover opposite to the movement from the open position to the closed position.

2. The electric wire protection cover structure according to claim 1, wherein
the electric wire protection cover is not in contact with a periphery of the electric wire when at the open position and the temporary locking mechanism locks the electric wire protection cover to the electric wire housing part at the open position.

3. The electric wire protection cover structure according to claim 1, wherein
the wall part locks the temporary locking part when a load received from the temporary locking part is less than or equal to an upper limit load, and when the load received from the temporary locking part is over the upper limit load, the wall part is bent to cancel a locking state of the temporary locking part, the upper limit load being set to be the load that combines an input load for a safety factor considering an error.

4. The electric wire protection cover structure according to claim 1, wherein
the hinge part moves the electric wire protection cover by a rotation of more than 180 degrees from the closed position to an engagement between the first temporary locking body and the second temporary locking body.

5. The electric wire protection cover structure according to claim 1, wherein
the second temporary locking part is formed as a projection protruding from the base part and facing the first temporary locking part with a space therebetween.

6. The electric wire protection cover structure according to claim 1, wherein
the second temporary locking body includes a penetration hole and a wall part continuing to the penetration hole, and
the first temporary locking body includes a base part that is inserted into the penetration hole and a temporary locking part that is locked to the wall part.

7. The electric wire protection cover structure according to claim 1, wherein
the first temporary locking part is provided as a claw at a free end of the base part.

8. An electric wire routing unit comprising:
a main body including an electric wire housing part in which an electric wire is inserted through an opening and housed;
an electric wire protection cover that closes the opening;
a hinge part that moves the electric wire protection cover relative to the opening between an open position and a closed position;
a regular locking mechanism that is lockable the electric wire protection cover to the electric wire housing part at the closed position where the opening is closed; and
a temporary locking mechanism that is lockable the electric wire protection cover to the electric wire housing part at the open position where the opening is not closed, wherein
the temporary locking mechanism includes a first temporary locking body provided to the electric wire housing part and a second temporary locking body provided to the electric wire protection cover,
one of the first temporary locking body and the second temporary locking body includes a penetration hole and a wall part continuing to the penetration hole, and
the other of the first temporary locking body and the second temporary locking body includes a base part that is inserted into the penetration hole and a temporary locking part that is locked to the wall part, and
the other of the first temporary locking body and the second temporary locking body includes, as the temporary locking part, a first temporary locking part that locks a movement of the electric wire protection cover from the open position to the closed position and a second temporary locking part that locks the movement of the electric wire protection cover opposite to the movement from the open position to the closed position.

* * * * *